US005699082A

United States Patent [19]
Marks et al.

[11] Patent Number: 5,699,082
[45] Date of Patent: Dec. 16, 1997

[54] ENHANCED PROGRAM ACCESS IN A GRAPHICAL USER INTERFACE

[75] Inventors: Ronald Franklin Marks, San Jose; Edwin Joseph Selker, Palo Alto, both of Calif.

[73] Assignee: International Business Machines Corporation, Armonk, N.Y.

[21] Appl. No.: 483,594

[22] Filed: Jun. 7, 1995

Related U.S. Application Data

[63] Continuation of Ser. No. 175,878, Dec. 30, 1993, abandoned.
[51] Int. Cl.⁶ .................................................. G09G 5/08
[52] U.S. Cl. ........................................ 345/157; 345/161
[58] Field of Search .................................... 345/119, 120, 345/113, 114, 156, 157, 160, 161, 163, 168, 169, 162, 159; 395/156, 157, 153; 74/471; 273/148 B

[56] References Cited

U.S. PATENT DOCUMENTS

| | | |
|---|---|---|
| 4,680,577 | 7/1987 | Straayer et al. . |
| 4,862,389 | 8/1989 | Takagi .................................. 345/119 |
| 5,079,723 | 1/1992 | Herceg et al. ......................... 395/156 |
| 5,146,556 | 9/1992 | Hullot et al. .......................... 395/159 |
| 5,155,806 | 10/1992 | Hoeber et al. ......................... 395/157 |
| 5,189,403 | 2/1993 | Franz ................................... 345/172 |
| 5,195,179 | 3/1993 | Tokunaga ............................. 395/161 |
| 5,237,651 | 8/1993 | Randall ................................ 395/148 |

FOREIGN PATENT DOCUMENTS

| | | |
|---|---|---|
| 37 11 582 A1 | 6/1987 | Germany . |
| 09982 | 11/1990 | WIPO .............................. G09G 3/02 |

OTHER PUBLICATIONS

"Automated Mouse Pointer Movement Function," IBM Technical Disclosure Bulletin, vol. 36, No. 4, Apr. 1993, Armonk, New York, USA, pp. 433–435.

"Depth/Force Capability for Point Stick Devices," Research Disclosure, Oct. 1992, Emsworth, GB, p. 769.

C. Heney, "That Thinking Feeling," PC User, vol. 16, No. 200, Dec. 1992, London, p. 35.

Microft Windows, User's Guide, "Selecting Open Directory Windows", pp. 112–114, 1990.

*Primary Examiner*—Chanh Nguyen
*Attorney, Agent, or Firm*—Baker, Maxham, Jester & Meador

[57] ABSTRACT

A pointing system for controlling a cursor on a computer display device includes a single control actuator that ordinarily controls movement of the cursor on the display device and also detects if an applied cursor force matches a predetermined tap signature. If the applied force substantially matches the predetermined tap signature, then the system responds to the applied force by initiating one or more display actions rather than by moving the display cursor. The system detects tap signature forces applied along the x, y, and z axes of the control actuator and responds by retrieving a cursor context comprising a window display and corresponding cursor location from a queue and opening the associated window. That is, the system changes the active window from among windows of a graphical user interface, preserving the cursor position within each window. Other tap signature responses can correspond to functions initiated by programmable function keys or to user-defined functions. The force signature needed to initiate the display actions comprises a short duration, low level of force, such as a tap on the cursor control actuator that defines a sawtooth-type pulse having a rapidly rising leading edge and a slower failing trailing edge. Off-axis forces, which cannot be detected as occurring primarily along one of the three axes, are ignored to prevent. inadvertent, undirected bumping of the control actuator from initiating unwanted action.

36 Claims, 10 Drawing Sheets

ENHANCED PROGRAM ACCESS IN A GRAPHICAL USER INTERFACE

This is a continuation of application Ser. No. 08/175,878, filed Dec. 30, 1993, now abandoned.

BACKGROUND OF THE INVENTION

1. Field of the Invention

This invention relates generally to control of computer displays with a pointing device and, more particularly, to enhanced pointing device functionality within graphical user interfaces.

2. Description of the Related Art

The interactive computer system operating environment, such as encountered by millions of users of the International Business Machines Corporation (IBM Corporation) PC-AT, PS/1, and PS/2 personal computers and the like, is characterized by increasing convenience and ease of operation. An important contribution to making the operation of such computers easier and more convenient is the graphical user interface (GUI). A GUI makes the operation of the computer much more intuitive and can increase the efficiency of the user.

A GUI system enables a user, for example, to move a cursor of the computer system display by using a GUI pointing device such as a display mouse or track ball attached to the computer. Generating a control input by moving the mouse across a desktop or rolling the track ball in its cradle moves the cursor in the same direction, according to a response function of the control input. Thus, the relationship between pointing device control input and cursor response is intuitive. Many GUI systems permit multiple programs to be represented simultaneously on the computer display as display windows. To activate a program, or to re-enter it, a user currently must target the display cursor within the desired program window and press a button of the mouse or track ball device. In this way, the keystrokes needed to activate or re-enter a program are eliminated or at least severely reduced, making the computer easier and more convenient to use. Pointing to a desired activity is highly intuitive and therefore makes learning the operation of the computer easier and more convenient.

Further improvements to cursor control are rapidly being achieved. For example, the IBM Corporation has introduced a cursor control feature in a notebook-sized portable computer called "ThinkPad 750" that provides a control actuator in the form of a small, substantially rigid "joystick" type actuator, called TrackPoint II, placed approximately in the center of a conventional computer keyboard. The TrackPoint II control actuator is placed approximately in the middle of the keyboard, between the home position of a typist's two hands, and is sufficiently short so it does not interfere with normal typing on the keyboard. A computer user can apply lateral forces to the control actuator to move the cursor around on the computer display, rather than using a display mouse. This feature is especially desirable in a portable computer, known as a laptop or notebook computer, where it can be inconvenient or difficult to connect a mouse or track ball to the computer to control cursor movement.

The TrackPoint II controller, being effectively a part of the computer keyboard, increases efficiency by adding cursor functions to a single control within the keyboard. That is, most conventional computer keyboards provide a set of independent cursor control keys that, when pressed, cause the display cursor to move in discrete steps along a single axis to the left, to the right, upward, or downward on the display. The TrackPoint II controller, however, provides a single integrated control actuator that translates lateral pressure into corresponding continuous and variable motion on the display when pressed to the left, right, upward, or downward. While the TrackPoint II controller represents a valuable increase in the operating ease and convenience of computer GUI systems, it would be advantageous to provide even greater ease, convenience, and efficiencies.

Thus, additional functionality of a pointing device for a GUI is needed such that the pointing device preserves control of the display cursor and maintains the intuitive operation of the GUI. Such enhanced functionality would permit additional control functions to be performed, such as program access, without increasing the number of control actuators. The present invention satisfies this need.

SUMMARY OF THE INVENTION

In accordance with the invention, a pointing system for controlling a cursor of a graphical user interface on a computer display device includes a single control actuator that ordinarily controls movement of the cursor on the display device and also detects if an applied force is within a predetermined actuator range of forces and direction, comprising a display change tap signature. If the applied force substantially matches the predetermined tap signature, then the system responds to the applied force by initiating a first display action rather than by moving the display cursor. The force signature needed to initiate the first display action preferably comprises a short duration, low level of force, such as a tap on the cursor control actuator. The force signature, for example, can comprise a sawtooth-type pulse having a rapidly rising leading edge and a slower falling trailing edge. The first display action can comprise a variety of computer actions that are frequently performed. For example, the first display action can comprise moving the cursor position to the last previous window and cursor location when a display command occurred. The cursor position within each display window is preferably preserved as active windows change. In this way, the cursor control actuator quickly controls movement of the display cursor when a steady force is applied to the actuator and performs a different function within the graphical user interface if the actuator is nudged or tapped according to a recognizable force signature or for a prescribed interval.

In one aspect of the invention, the control actuator can detect forces that are applied along three axes, comprising an x-axis, a y-axis, and a z-axis. In the case of a control actuator such as the TrackPoint II stick controller in a keyboard, for example, the x-axis and y-axis are defined by lateral and vertical forces applied, respectively, in the plane of the keyboard and the z-axis is defined by pressing forces applied along the longitudinal axis of the TrackPoint II stick controller, perpendicular and into the plane of the keyboard. For each force axis that can be detected by the cursor control actuator, a different associated system function or display action can take place. Off-axis forces, which cannot be detected as occurring primarily along one of the three axes, can be ignored to prevent inadvertent, undirected bumping of the control actuator from initiating unwanted action.

In another aspect of the invention, a multiple axis control actuator and a cyclic queue are used to select cursor contexts. The cyclic queue preferably is a cursor context queue that contains cursor contexts comprising a window display and corresponding cursor location that are entered into the queue either automatically or in response to user designations. The control actuator can then be used to cycle through the cursor context queue as the control actuator is tapped. For example, a second display action can comprise stepping up and down through a cyclical queue of display windows and cursor locations in response to right and left (lateral) or up and down (vertical) taps, respectively, applied to the actuator, while a third display action can comprise obtaining access to a root window via toggling from among display windows by applying pressing (inward) forces.

Other features and advantages of the present invention should be apparent from the following description of the preferred embodiment, which illustrates, by way of example, the principles of the invention.

DESCRIPTION OF THE PREFERRED EMBODIMENT

Figure 1:
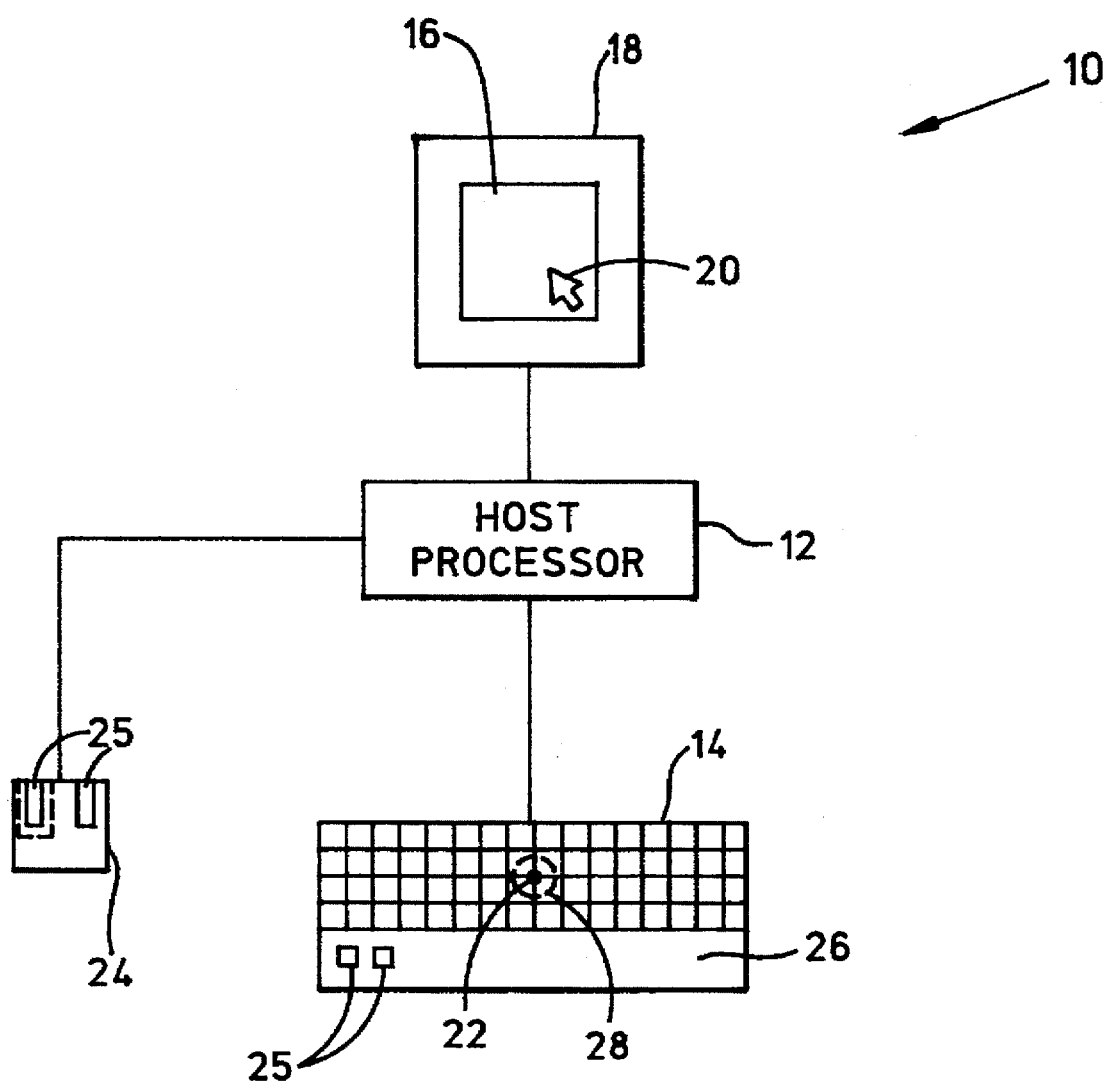
FIG. 1 is a schematic representation of a computer system constructed in accordance with the present invention.

FIG. 1 shows a computer system 10 constructed in accordance with the present invention. The computer system includes a host processor 12 that receives control inputs from an attached keyboard 14 and displays system responses on a display screen 16 of a display device 18 that is connected to the host processor. A cursor 20 is displayed on the display screen and can be used to designate system tasks, change the display, and the like. The computer system 10 includes two cursor control actuators, a display stick control device 22 and an optional display mouse control device 24. The cursor control actuators can be used to generate display commands that initiate tasks and display changes by using the actuators to move the cursor 20 on the display screen 16 to a task icon and then actuate, or "click", button switches 25 on the mouse or on a keyboard hand rest 26. In accordance with the invention, the cursor control actuators of the system 10 also can be used to initiate display changes and the like without moving the cursor and without clicking the buttons 25. A simple directed tap or nudge to one of the control actuators automatically causes a display change or system task to be initiated, providing enhanced functionality. The user may select whether both cursor control actuators or, more typically, the stick controller 22 alone, shall have this enhanced functionality. In this way, the cursor control actuator(s) 22 (24) control movement of the display cursor 20 when they receive a steady force and perform a different function when they are quickly tapped, thereby increasing the number of display functions that can be quickly performed without increasing the number of control actuators, or the number of actuator operations, necessary to make a display change.

The stick control device 22 of the keyboard 14 comprises a rigid, generally elongated rod, sometimes referred to as a joystick, that extends perpendicularly from approximately the middle of the keyboard, between the home position of a typist's two hands, and is sufficiently short so that it does not interfere with normal typing on the keyboard. The stick control device can comprise the TrackPoint II control device by the IBM Corporation, for example, which currently is one of the more advanced control devices of this kind and is described in the co-pending U.S. patent application assigned Ser. No. 07/917,091 entitled "Controller for Improved Computer Pointing Devices" assigned to IBM Corporation and filed Nov. 20, 1990.

The operation of the system 10 will be described with respect to actions applied to the stick controller 22. It is to be understood, however, that analogous structures and system responses also can be associated with the mouse 24.

Lateral forces can be applied to the stick control device 22 to move the cursor 20 about on the display screen 16 in a generally intuitive manner. That is, applying a control force directed to the left or right of the keyboard 14 as illustrated in FIG. 1 will cause the cursor to move left or right, respectively, on the display. Similarly, applying a force directed toward the top or bottom of the keyboard as illustrated in FIG. 1 will move the cursor toward the top or bottom of the display.

The stick control device 22 includes a force transducer array 28 that converts the applied forces into electrical signals that detect the direction and magnitude of the applied force and move the cursor 20. One or more associated switches, such as the buttons 25 on the mouse 24 or hand rest 26 or an "enter" button (not illustrated) on the keyboard 14, are conventionally used to select cursor-targeted screens. The enhanced functionality of a control actuator, such as the TrackPoint II type device described herein for the preferred embodiment, may in principle be extended to a mouse or external joystick control device. The host processor 12 comprises, for example, the processing unit of an IBM Corporation Model "PS/2" or "ThinkPad 750" personal computer or the like. The display device 18 comprises a conventional video display terminal or flat panel display.

Figure 2:
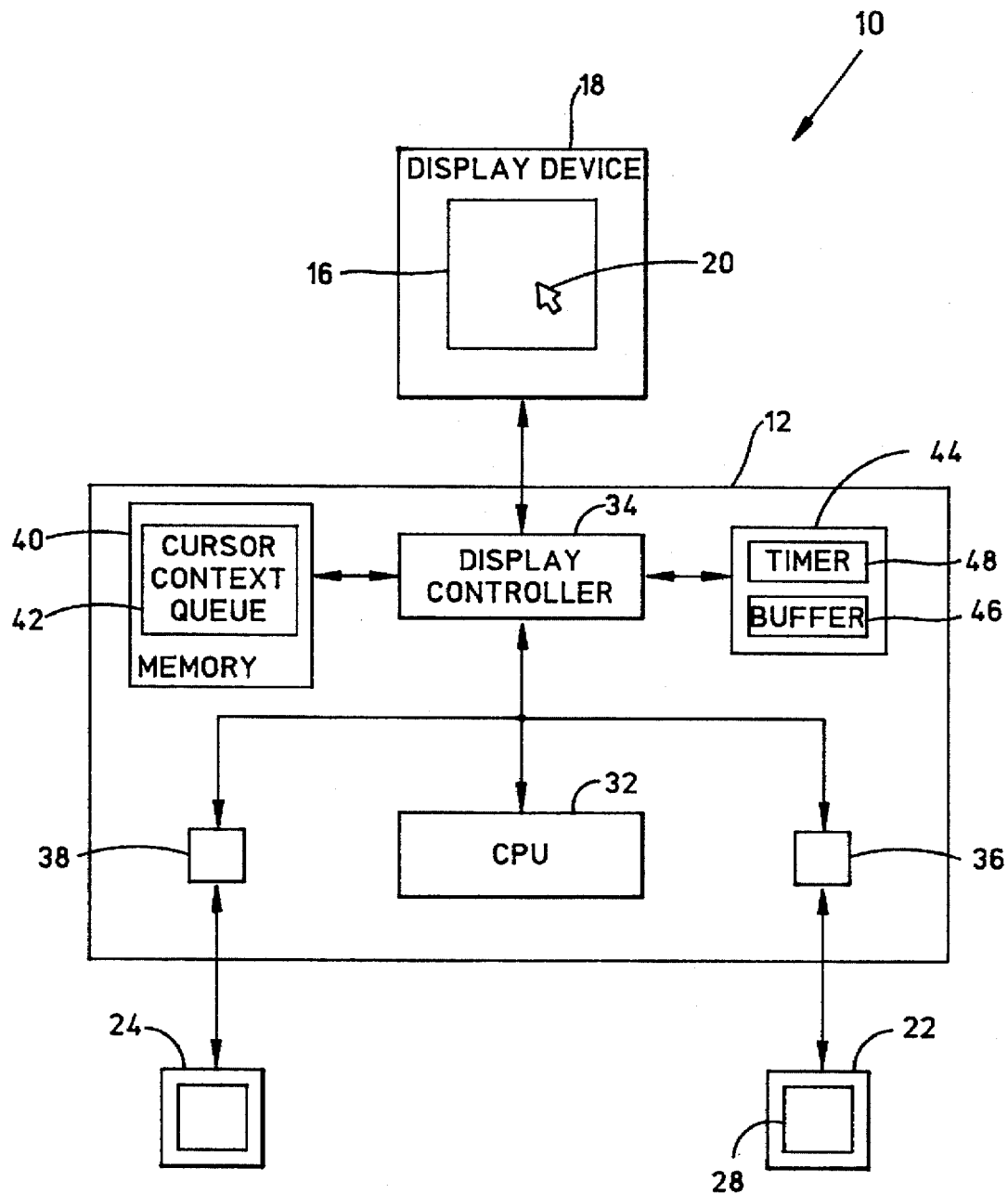
FIG. 2 is a block diagram showing cursor control details of the computer system illustrated in FIG. 1.

FIG. 2 is a block diagram showing the computer system 10 in greater detail. The keyboard 14 is not illustrated, for simplicity. FIG. 2 shows that the host processor 12 includes a central processing unit (CPU) 32, which communicates with a display controller 34 and thereby controls the images displayed on the display screen 16 of the display device 18. The stick controller 22 and mouse 24 are connected to the display controller and CPU via respective stick and mouse interfaces 36 and 38. FIG. 2 also shows that the host processor 12 includes a memory 40, a portion of which is used as a cursor context queue 42. As described further below, the cursor context queue stores display window identifiers as well as the cursor position within each display window. A tap signature identifier 44 recognizes forces applied to the stick controller 22 and mouse 24 that match a predetermined tap signature and thereby constitute directed taps for predetermined display functions.

In operation, a force applied to the stick controller 22 is detected by the associated stick force transducer 28, which provides the magnitude and direction of the applied control force to the stick interface 36. The display controller 34 receives this information and provides it to the tap signature identifier 44. The tap signature identifier preferably includes a control actuator buffer 46 and timer 48 that permit comparison of a moving time interval of applied control actuator forces as represented by the transducer signal against a predetermined tap signature. The tap signature identifier can determine, for example, if the force applied to the stick controller 22 for the previous split-second's worth of time comprises a waveform that describes a tap comprising a sawtooth-type pulse having a rapidly rising leading edge and a slower falling trailing edge. That is, the control actuator buffer 46 continuously receives the applied force transducer signal and the tap signature identifier 44 performs correlation processing on the buffer contents to assess the likelihood that the applied force was a tap, an inadvertent undirected nudge, or the beginning of a continuous cursor control input.

Figure 3:
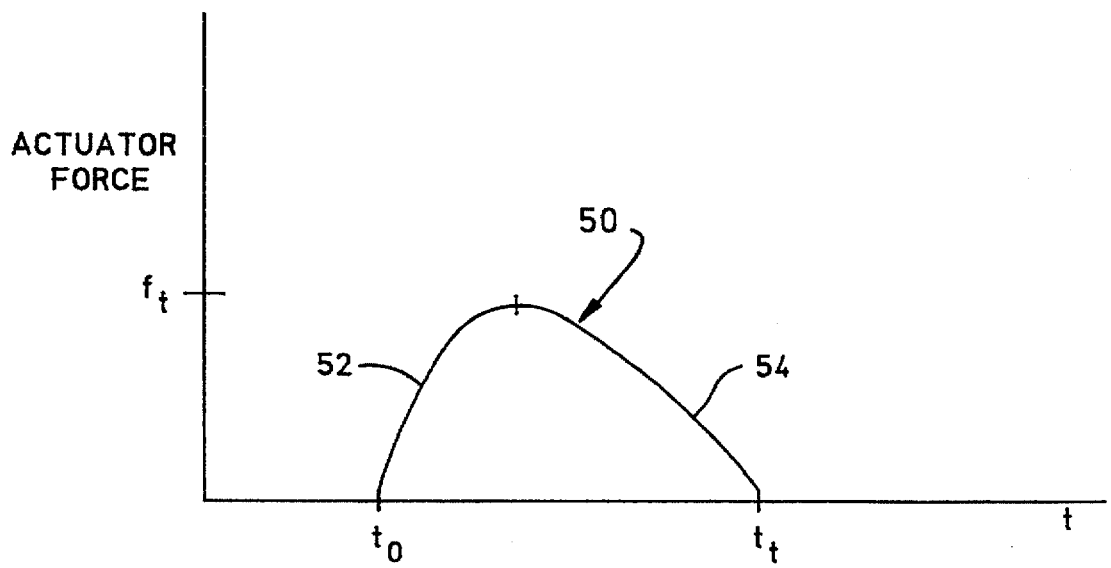
FIG. 3 is a chart showing a tap signature waveform used by the display controller illustrated in FIG. 2 for responding to control actuator forces.

FIG. 3 shows a chart that illustrates the tap signature waveform 50 that is used by the tap signature identifier 44 to determine when a display change will occur, as a function of time (on the horizontal axis) and control actuator force (on the vertical axis). The chart shows that the applied force begins at a time $t_0$ and has a duration of $t_t$ and includes a relatively rapidly rising leading edge 52 up to a peak force $f_t$ and a relatively slowly falling trailing edge 54. If the control actuator buffer 46 contents have a sufficiently high correlation coefficient with respect to a predetermined tap signature waveform, then the display controller performs the appropriate display change or system function. Thus, forces applied to the actuator 22 that do not correlate sufficiently with the tap signature waveform 50 are regarded as alternative control inputs or inadvertent, undirected taps and do not result in display changes. Those skilled in the art will recognize that the tap signature waveform and the correlation with the buffer contents necessary for display changes can be tailored for various applications and preferences, as desired.

Rather than comparing applied forces against a predetermined waveform, the tap signature identifier 44 can use a simpler tap signature criterion. In particular, the tap signature identifier can use the timer 48 to simply determine the time duration of the applied force and provide the information to the display controller 34, which then determines if display changes are warranted, based on the time duration and magnitude of the applied force. If the magnitude of the applied force was within a predetermined range of force values, as indicated by the control actuator transducer 28, and was indicated by the timer 48 as being applied to the control actuator for a predetermined short time interval and released, then the display controller 34 changes the display, as described further below. As soon as the force applied to the control actuator extends beyond the predetermined short time interval, such as would be the case for a continuous force, then the display Controller moves the cursor 20 across the display screen 16 in accordance with the applied force, without otherwise changing the display screen.

Figure 4:
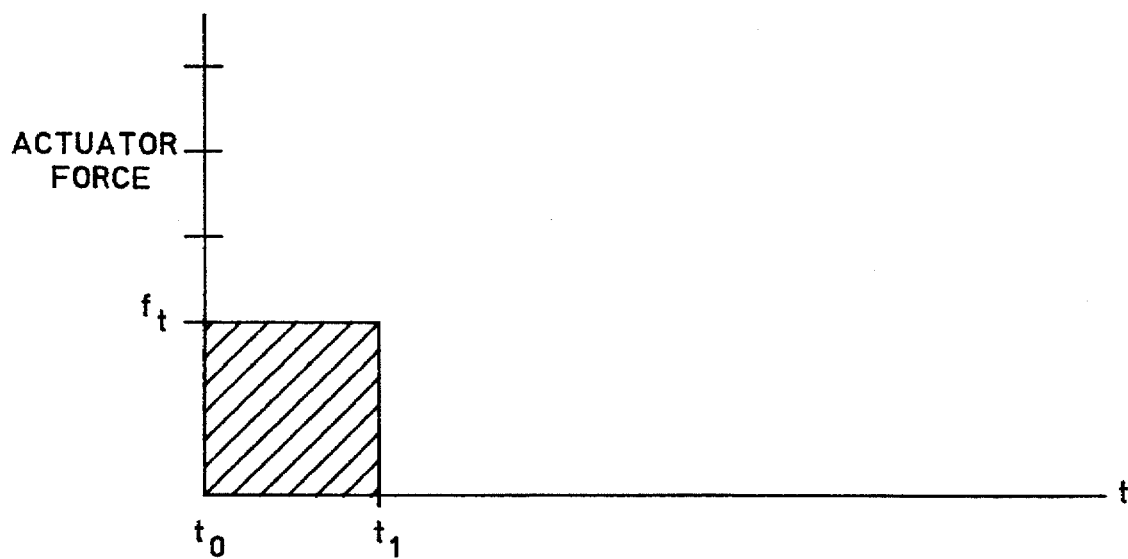
FIG. 4 is a chart showing a force and time transfer function used by the display control illustrated in FIG. 2 for responding to control actuator forces.

FIG. 4 shows a chart that illustrates the simplest temporal signature criterion for a display change as a function of time (on the horizontal axis) and control actuator force (on the vertical axis). The shaded portion of the chart shows the duration and magnitude of control actuator force that results in the display change action. Thus, forces applied to the actuator 22 for less than a predetermined time interval $t_1$ and having a transducer signal magnitude less than $f_t$ will result in the display change described further below. Other alternatives will occur to those skilled in the art. For example, the display change action can take place in response to a control actuator force having any magnitude, so long as the duration is less than the $t_1$ time interval. Moreover, the $t_1$ time interval illustrated in FIG. 4 can be different from the $t_t$ time interval of the tap signature waveform illustrated in FIG. 3.

In the preferred embodiment, the display controller 34 requires that a predetermined short time interval of no force application, a blank interval, precede the tap signature criteria illustrated in FIG. 3 and FIG. 4. In this way, active cursor display movement changes are not interpreted as display change taps. This eliminates, for example, changes in cursor movement direction from being interpreted as display change taps. The blank interval preferably is a relatively short time interval, approximately equal to the tap signature display change time interval. The timer 44 provides a convenient means for determining display change taps.

Thus, the timer 48 of the tap signature identifier 44 is used so that only short duration control actuator forces initiate display changes other than cursor movement. This is to distinguish between short duration taps on the display control actuator 22 meant to change the display and continuous applications of force meant to initiate cursor movement. The display controller 34 detects short duration taps by detecting from the timer 48 the duration of force application. Preferably, only relatively low magnitude, short duration applications of force to the control actuators will result in a display change. Thus, forces applied to the control actuators for greater than a predetermined time interval will result in display cursor movement. Forces that are applied for no more than the predetermined time interval will result in a display change. Other responses, however, can be selected, modified, or added, as described herein.

The speed with which the cursor 20 is moved across the display screen, for example, can depend on the magnitude and duration of the applied control actuator force. The cursor 20 can be controlled, for example, according to the force applied to one of the control actuators as described in the co-pending U.S. patent application assigned Ser. No. 08/006,427 entitled "Tactile Feedback Mechanism for Cursor Control" assigned to IBM Corporation filed Jan. 20, 1993 and incorporated herein by reference.

In the preferred embodiment of the computer system 10, a graphical user interface is supported and the display device 18 displays a conventional window operating environment in which multiple windows can be displayed simultaneously on the display screen 16. As well-known to those skilled in the art, each window represents a program or system operation that is "opened" and therefore is accessible when the cursor 20 is targeted within the window and a mouse or handrest button 25 is activated or an "enter" keystroke is executed. Multiple windows may be opened simultaneously and displayed on the display screen, which thereby constitutes a desktop display, such that the windows may be stacked or overlapped and some may be partially hidden from view. One of the overlapped windows, generally the top-most window in a stack of windows, is designated the "active" window.

The display changes that are initiated in response to tap signature forces, or display change taps, can comprise a variety of actions. For example, the computer system 10 can display a variety of system operating windows, well-known to those skilled in the art, on the display screen 16. Other responses to display change taps can comprise functions otherwise performed by programmable function keys, known as PF keys, or can be user-defined functions. If the force transducers of the control actuators can determine control actuator force as a combination of forces applied along a variety of axes, then a tap signature force applied along each axis can be associated with a different display change. For example, if the control actuator comprises the control stick 22 extending from the keyboard 14, and if the associated transducer 28 can detect forces applied along an x-axis, a y-axis, and a z-axis, then different display changes can be associated with each of the three axes.

In one aspect of the system 10, the display controller 34 uses a cyclical cursor context queue 42 to keep track of the opened windows displayed on the display screen 16 as well as the last cursor location in each window. A cursor context comprises both the window status, or window being displayed, and the cursor location in the window. The cursor context queue can be used to keep a list of window status identifiers and cursor locations as windows are opened or become the active window, or the cursor context queue can be used to keep a list of windows and cursor locations as windows are placed on top of one another in the display, or dual queues can be maintained to keep track of both sets of information. Other techniques for keeping track of the open windows in the display and for keeping track of the active window will occur to those skilled in the art. The functions performed by the control actuators can be used to selectively step through the contents of each respective cursor context queue that is defined. Regardless of the number of queues maintained by the display controller 34, one of the window identifiers is designated the active window and occupies the top spot in the display.

In the preferred embodiment, the cursor context queue 42 includes an automatic queue and a user-defined queue. The automatic queue is automatically filled with window identifiers and corresponding cursor locations as a system user makes window display commands, whereas the user-defined queue is filled with window identifiers and corresponding cursor locations in response to user queue control commands. A window display command occurs when a user targets a window or command icon within a window using the cursor and makes a selection by clicking one of the mouse or handrest buttons 25 or the "enter" button, as described above. A user queue control command can comprise, for example, pressing a predetermined function key or a sequence of keyboard keys.

In particular, when a user makes a window display command, the system 10 automatically stores the window status at the time of the command, including any drop-down menu or other command artifact displayed in the window, along with the cursor location in the window, into the automatic queue portion of the cursor context queue 42. As the user makes window display commands, the automatic queue eventually becomes filled and the queue is changed on a first-in-first-out basis. That is, new window display commands generate new cursor context entries that replace older cursor context entries in the automatic queue. Those skilled in the art will recognize that window display commands that are triggered by targeting a menu item and pressing the "enter" button, which generate an automatic cursor context queue entry, must be distinguished from enter button presses that are not associated with a window display command, which do not generate a cursor context queue entry.

Thus, as a user generates window display commands to move from program to program and therefore from active window to active window, and designates, pulls down, or otherwise makes use of features within each window, the cursor context comprising the window identifier and status as well as the cursor location at the time the window display command was issued, are placed in the next available location of the cursor context queue 42. The user can cycle through the automatic queue entries of the cursor context queue by repeatedly tapping the control actuator along one of the control axes, such as the x axis. Tapping the control stick in the leftward direction, for example, can move backward through the automatic queue while tapping the control stick in the rightward direction can move forward through the queue.

As noted above, a cursor context is placed in the user-defined queue when the user makes a predetermined queue control command, such as pressing a function key typically provided on the keyboard. In this way, the user can designate particular programs or windows to which the user might want to return after continuing with other actions. In the preferred embodiment, the user can cycle through the user-defined queue entries of the cursor context queue 42 by repeatedly tapping the control actuator along one of the control axes, such as the y axis. As the user generates entries in the queue, newly defined cursor contexts replace older cursor contexts in the queue. Thus, a user can return to prior windows and continue working from the last cursor position in each window by repeatedly tapping the control stick 22 along the y-axis. Tapping the control stick in the upward direction, for example, can move backward through the user-defined queue while tapping the control stick in the downward direction can move forward through the queue.

Other types of cursor context queues can be provided. For example, if the cursor context queue 42 lists the windows in the order of screen placement, such as layers of overlapping windows, then each force matching the tap signature described above in connection with FIG. 3 or FIG. 4, comprising a tap signature force, applied in the direction of the x axis can be used to bring a different one of the placement queue windows to the top of the queue, thereby causing the associated window to be displayed as the new active, top-most window, along with the corresponding cursor location. If the cursor context queue also lists the windows in the order in which they were opened, then each tap signature force applied in the direction of the y axis can be used to bring a different one of the time queue identifiers to the top of the queue, thereby causing the associated window to be displayed as the new active window, along with the corresponding cursor location. A tap signature force applied in the direction of the z axis can be used for another change. For practical reasons apparent to those skilled in the art, z axis force measurement may respond only to inwardly directed (pressing) forces and therefore a tap signature force applied in the z direction may be best suited to a toggling function such as selection of a predetermined, possibly user-defined, window or other display change.

Figure 5:
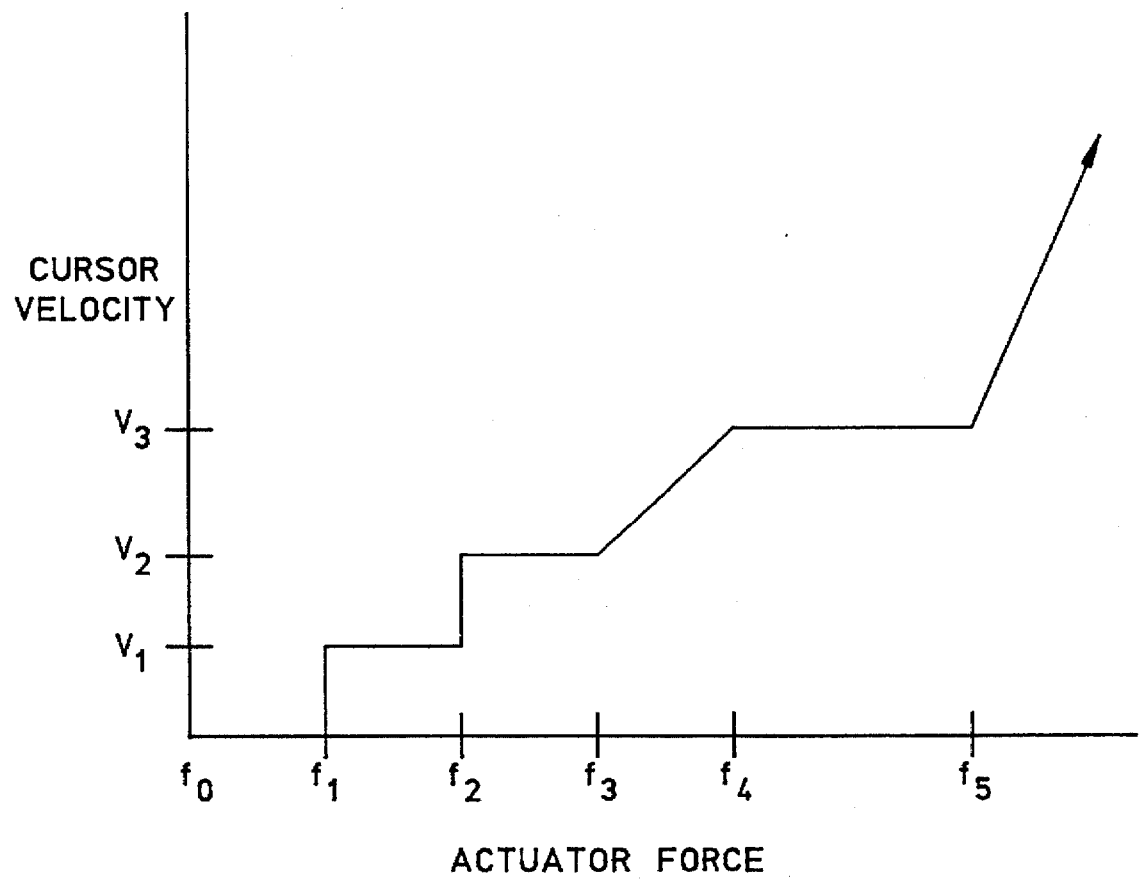
FIG. 5 is a chart showing the transfer function used by the display controller illustrated in FIG. 2 for controlling cursor movement.

FIG. 5 shows a chart of cursor velocity as a function of the control actuator force. FIG. 5 shows that for forces below a predetermined magnitude of $f_1$, no cursor movement will be initiated. For control actuator forces having a magnitude greater than $f_1$ and less than $f_2$, cursor movement will be at a relatively low rate of $v_1$ to make cursor placement easier. Control actuator forces having a magnitude greater than $f_2$ and less than $f_3$ will result in cursor movement at a second velocity $v_2$. Control actuator forces greater than $f_3$ and less than $f_4$ have a linearly increasing velocity function up to velocity $v_3$. The velocity $v_3$ approximately agrees with an eye-tracking limit speed and is constant for a relatively large range of forces from $f_4$ to $f_5$ to permit a user to press the actuator without losing the cursor on the display screen. Finally, control actuator forces having a magnitude greater than $f_5$ result in a steeply inclined velocity function to permit users to move the cursor across the screen almost instantaneously. It should be understood that the force value $f_1$ indicated in FIG. 5 for cursor movement can be a different magnitude than the force value $f_t$ indicated in FIG. 4 for a display change.

Figure 6:
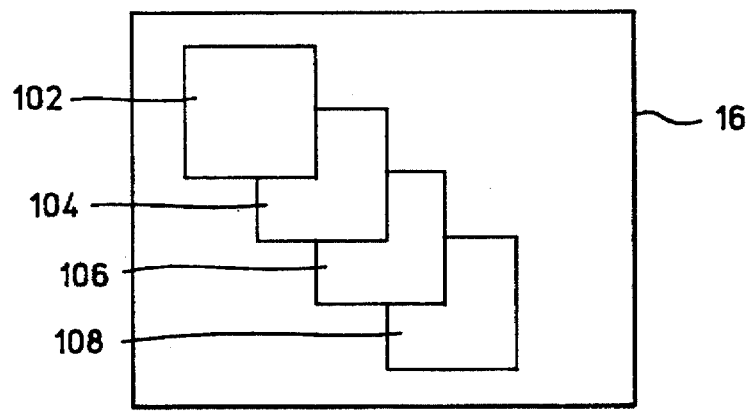
FIGS. 6, 7, and 8 are representations of displays that illustrate the program access functions provided by the system illustrated in FIG. 1.
Figure 7:
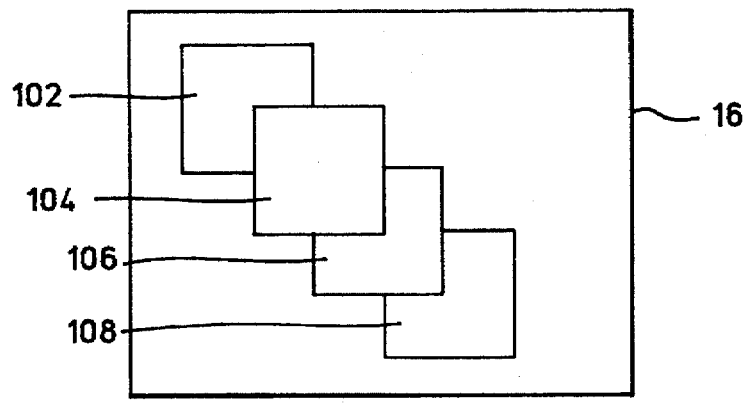
Figure 8:
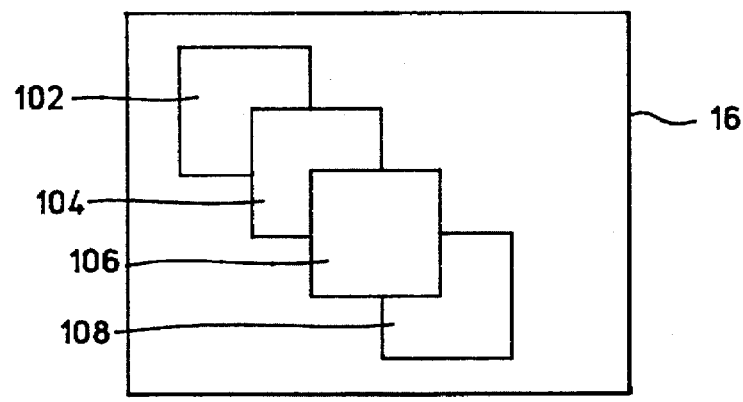

FIGS. 6, 7, and 8 show windows that are overlapped according to their relative positions in the cursor context queue 42 and illustrate display screen changes as a result of a succession of tap signature forces applied along one of the axes. In the preferred embodiment, for example, forces applied along the x-axis are used to select cursor contexts from the automatic queue of the cursor context queue 42 so that forces applied in the rightward (or leftward) x direction will activate the next window (or previous window) in the queue and restore the cursor to its corresponding location in the window. Alternatively, forces applied along the x axis can be used to select from a queue containing overlapped, stacked display window displays so that forces applied in the rightward (or leftward) x direction will activate the window to the right (or left) of the top display window, such that the newly-defined top-most window is immediately active and the cursor location is set to its last active position in that window, as indicated from the cursor context queue 42.

Thus, FIG. 6 shows the display screen 16 with a series of four overlapped display windows 102, 104, 106, 108 displayed in a manner well-known to those skilled in the art, forming a stack with one window 102 at the top of the stack. FIG. 7 shows the same windows after an applied force having the recognized display change tap signature has been applied to the right. In FIG. 7, a new top-most window 104 has replaced the prior top-most window 102 from FIG. 6. The new top-most window corresponds to the next display and corresponding cursor location from the cursor context queue. An additional rightward display change tap results in the display shown in FIG. 8. The process will cycle or "wrap" so that two rightward display change taps from the display of FIG. 8 will restore the display of FIG. 6, where the cursor context queue contains only the four cursor contexts illustrated. Those skilled in the art will recognize that this restoration could be accomplished by two leftward display change taps without use of the cyclical wrap feature. In each case, the top-most window of a display is designated the active window.

As noted, display change taps applied substantially along different axes can control different display changes. Display change taps applied along the y-axis of the control actuator can be used, for example, to select window displays from the user-defined queue of the cursor context queue 42. Alternatively, y-axis taps can be used to select different window displays from a queue containing displays and corresponding cursor locations in the time order in which each window was opened. Although the GUI may by default create a display, in spatial and temporal window match, user functions such as zooming or dragging windows may alter this correspondence. The use of y-axis taps for a temporal queue may offer added ease of use.

Alternatively, display change taps applied along the x-axis can be used to cycle the windows in an overlapped stack so that the top window is moved to the bottom window and the second window is moved to the top, and display change taps applied along the y-axis can be used to cycle the window at the bottom of the stack to the top while the previous top display window is moved down by one.

In another embodiment, the stick control device 22 can detect movement along the z-axis. Preferably, the stick detects forces directed along the z direction. That is, only display change taps pushing axially (pressing) on the stick controller are detected to indicate state changes, and no pulling axial forces are registered or recognized. The display controller 34 can respond to z-axis forces, for example, by opening a predetermined root window, such as a main window or a program manager window, or can be used to open a user-defined window.

Figure 9:
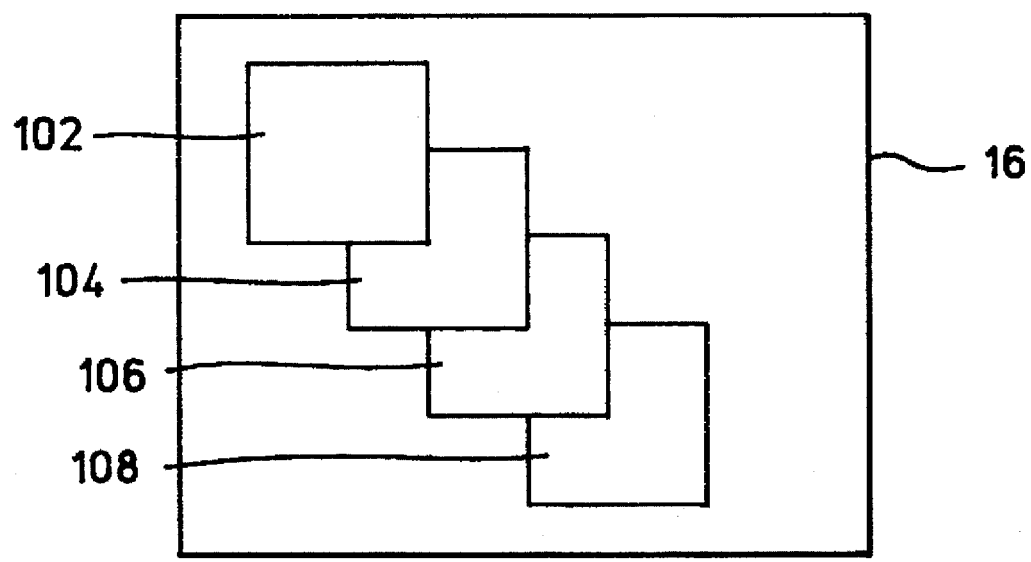
FIGS. 9 and 10 are representations of displays that illustrate additional program access functions provided by the FIG. 1 system.
Figure 10:
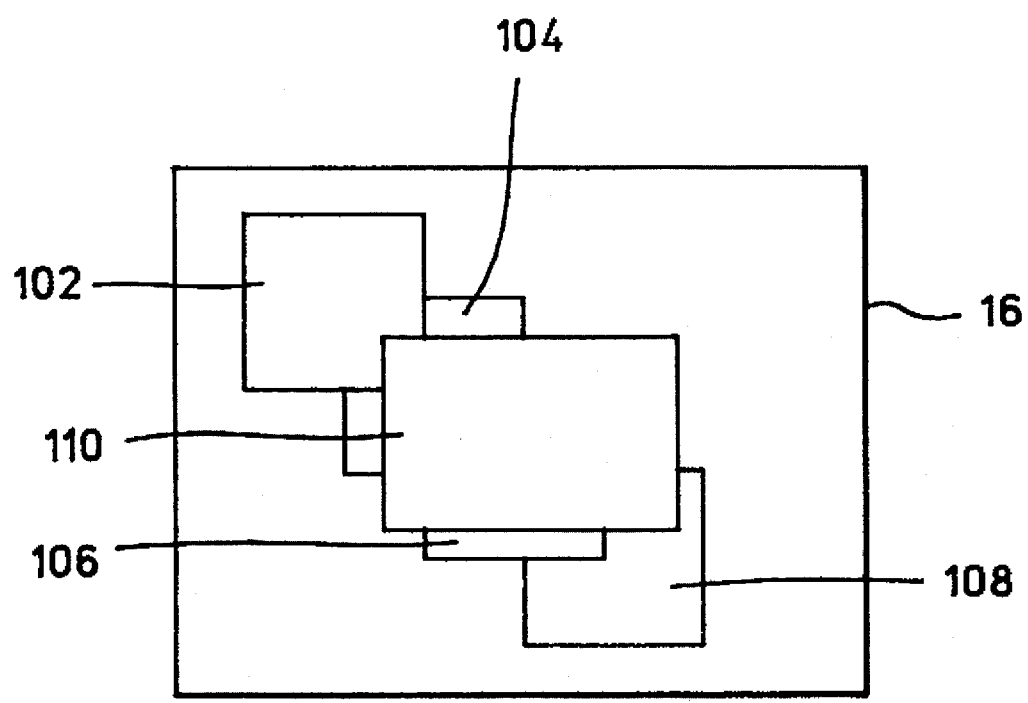

FIGS. 9 and 10 illustrate a display change such as described above for z-axis forces. In FIG. 9, four overlapped and partially hidden windows 102, 104, 106, 108 are shown. FIG. 10 illustrates that the display processor 34 responds to a z-axis display change force by displaying a root window 110 on top of the already-displayed windows. The root window can comprise, for example, a main window or program manager window, known to those skilled in the art.

Figure 11:
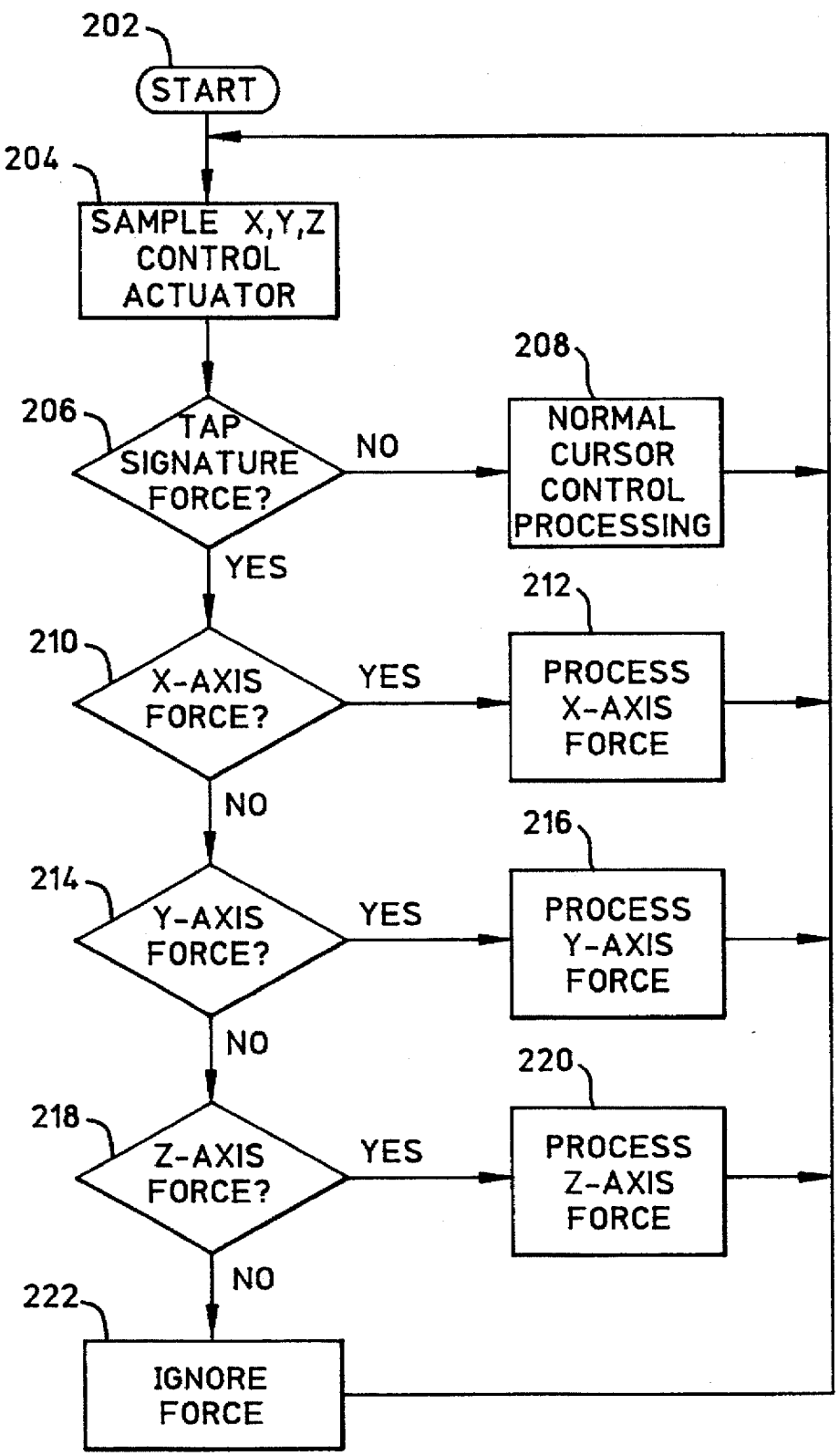
FIG. 11 is a flow diagram illustrating the processing steps carried out by the display controller illustrated in FIG. 2 in response to control actuator forces.

FIG. 11 is a flow diagram that illustrates the processing steps of the computer system as illustrated in FIG. 1. In FIG. 11, the processing routine begins with the start box numbered 202. The next flow diagram box 204 indicates that the status of the control actuator is sampled. FIG. 11 indicates that the control actuator can detect forces applied as a combination of forces along an x axis, a y axis, and a z axis. At decision box 206, a tap signature display change force is tested for by the tap signature identifier. If the applied force is not a display change force, then normal cursor control processing is implemented at the flow diagram box numbered 208. Processing then returns to the sampling box 204.

If the applied force was of a recognizable display change tap signature, such as the sawtooth waveform illustrated in FIG. 3 or the short duration, low-magnitude criteria illustrated in FIG. 4, then the force is checked at the decision box numbered 210 to determine if the tap was oriented along the x-axis. An affirmative response at box 210 results in the initiation of processing an x-axis force, indicated at the flow diagram box numbered 212. Processing then returns to the sampling box numbered 204. If the applied force was not an x-axis force, then at decision box 214, a y-axis force is checked. If the force was applied along the y-axis, then processing for the y-axis is initiated at the box numbered 216. Processing then returns to the sampling box numbered 204. Next, if the force was applied substantially along the z-axis, then z-axis processing is initiated at the flow diagram box numbered 220. Finally, if the applied force had the requisite waveform shape or short duration, but was not directed primarily along either the x-axis, the y-axis, or the z-axis, then the applied force is considered an inadvertent force and is ignored, as indicated by the flow diagram box numbered 222. Processing then returns to the sampling box numbered 204.

Figure 12:
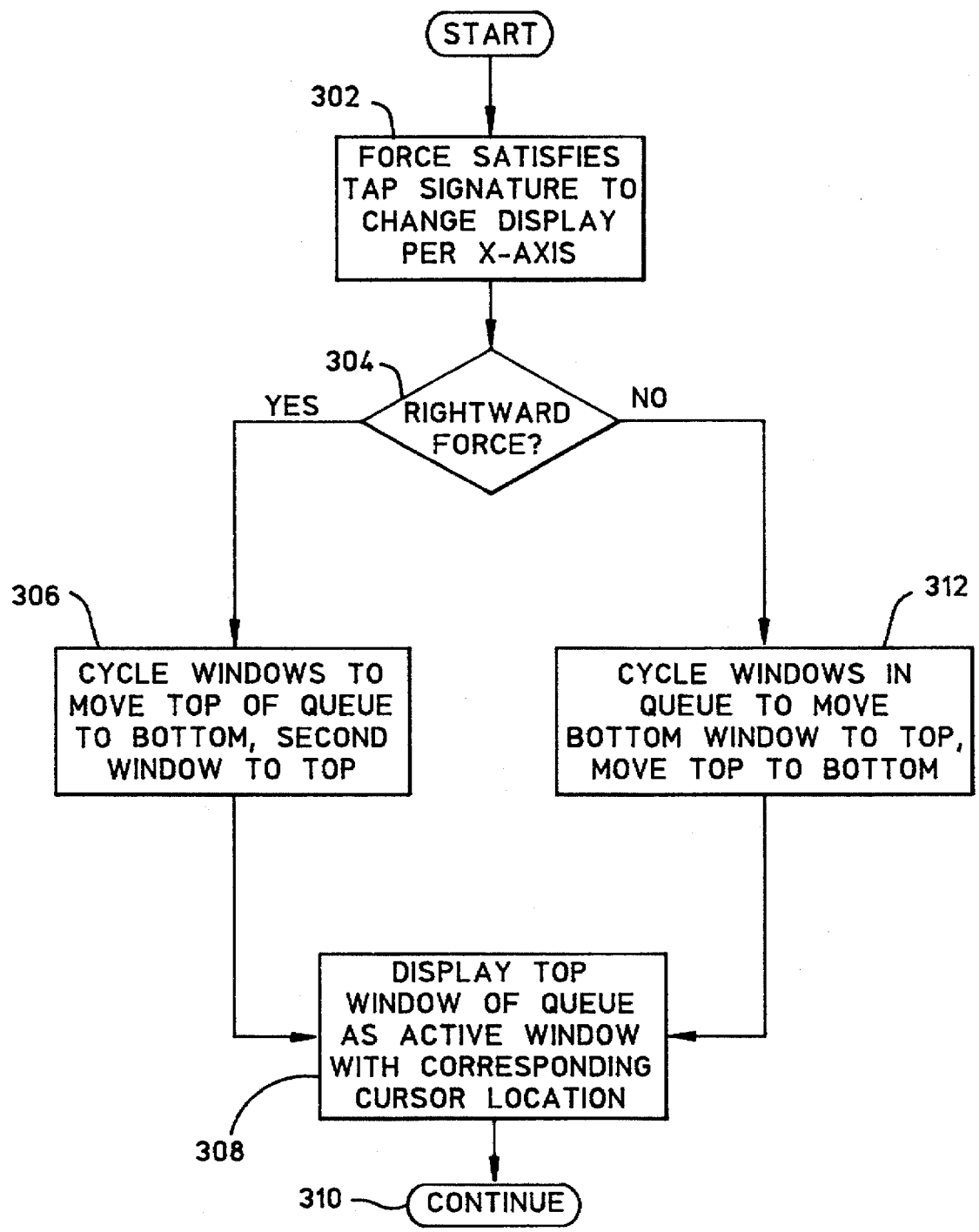
FIGS. 12, 13, and 14 are flow diagrams that illustrate additional processing steps carried out by the display controller illustrated in FIG. 2.

FIG. 12 illustrates the processing for an x-axis force (box 212 of FIG. 10) according to the preferred embodiment, in which x-axis forces are mapped to automatically defined cursor contexts. That is, the x-axis forces cause changes to the cursor context queue 42 in which window display identifiers and cursor locations are stacked by relative position in accordance with the order in which window commands were generated. First, the tap signature to change the window display is detected at the box numbered 302. Next, in accordance with processing for x-axis forces, the display controller cycles the entries in the cursor context queue depending on whether the force was applied leftward or rightward, as indicated by the decision box numbered 304. For forces applied rightward, the window displays are cycled such that the cursor context previously at the top of the queue is moved to the bottom and the previously second cursor context is moved to the top. This is indicated at the flow diagram box numbered 306. Next, the window display at the top of the queue is designated the new active window and is displayed on the display screen, along with the corresponding cursor location, as indicated at the flow diagram box numbered 308. The computer system processing resumes at the continuation box numbered 310. That is, processing returns to box 204 of FIG. 11. For forces applied leftward, the window displays are cycled such that the cursor context at the bottom of the queue is moved to the top and the former top cursor context becomes the second, as indicated at the box numbered 312. As before, the new top cursor context comprises a window with corresponding cursor location at box 308, and processing continues at box 310.

Figure 13:
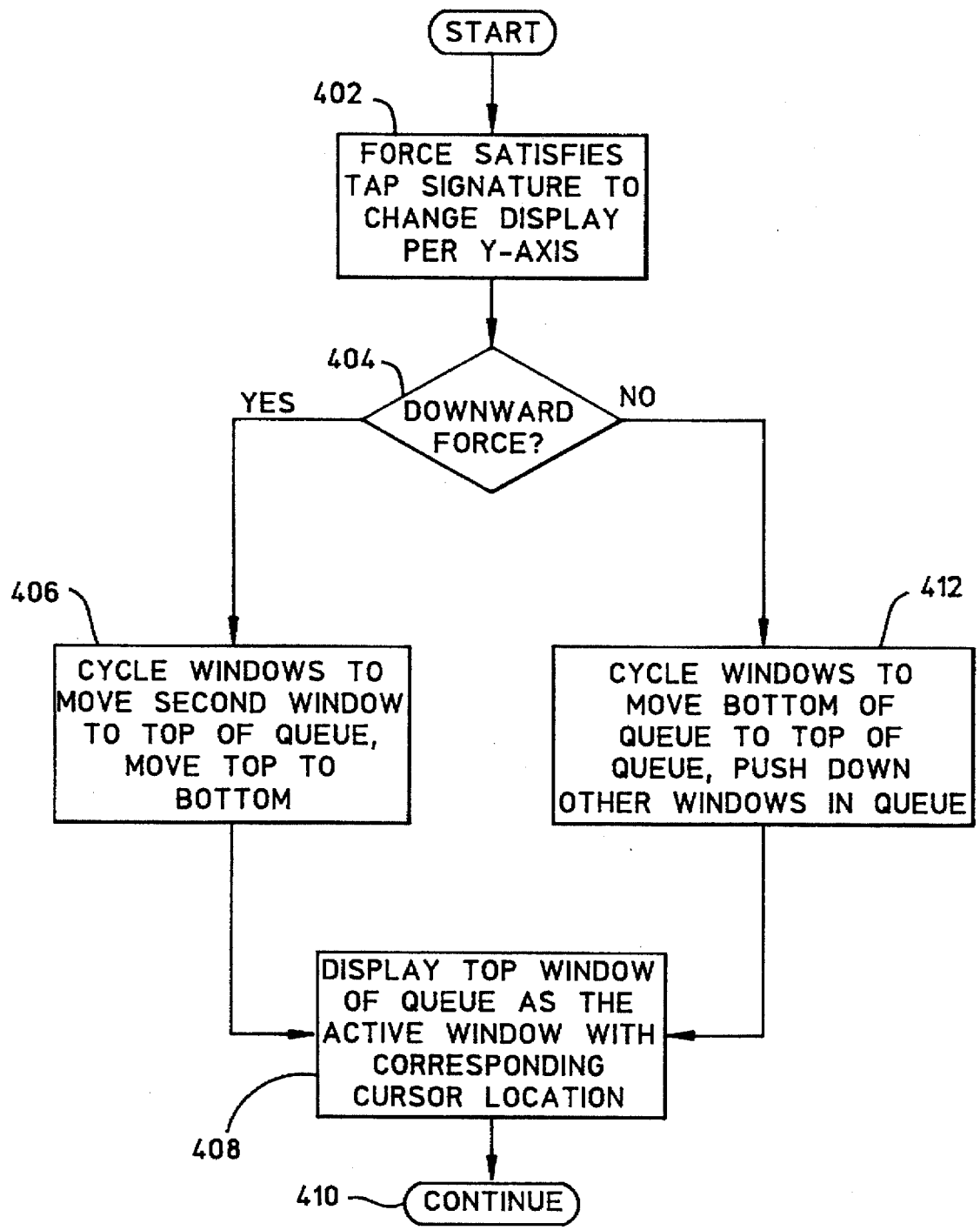

FIG. 13 illustrates the processing for a y-axis force (box 216 of FIG. 11) according to the preferred embodiment, in which y-axis forces are mapped to user-defined window displays. Thus, the y-axis forces cause changes to the cursor context queue 42. First, the tap signature to change the window display is detected at the flow diagram box numbered 402. Next, in accordance with processing for y-axis forces, the display controller cycles the entries in the cursor context queue depending on whether the tap was downward or upward, as indicated by the decision box numbered 404. For forces applied downward, the window displays are cycled such that the second cursor context in the queue is moved to the top of the queue as the top is moved to the bottom. This is indicated at the flow diagram box numbered 406. Next, the cursor context at the top of the cursor context queue is displayed as the active window on the display screen, along with the corresponding cursor location, as indicated at the flow diagram box numbered 408. The computer system processing resumes at the continuation box numbered 410. For upward taps, the window displays are cycled such that the cursor context previously at the bottom of the queue is moved to the top of the cursor context queue and the remaining cursor contexts are pushed down in the queue, as indicated at the flow diagram box numbered 412. As before, the new top cursor context in the queue is displayed as the new active window and is displayed with corresponding cursor location at box 408 and computer system processing continues at box 410. It should be noted that, because not all windows will be overlapped, the time-ordered cursor context queue will not necessarily correspond to the placement-ordered cursor context queue.

Figure 14:
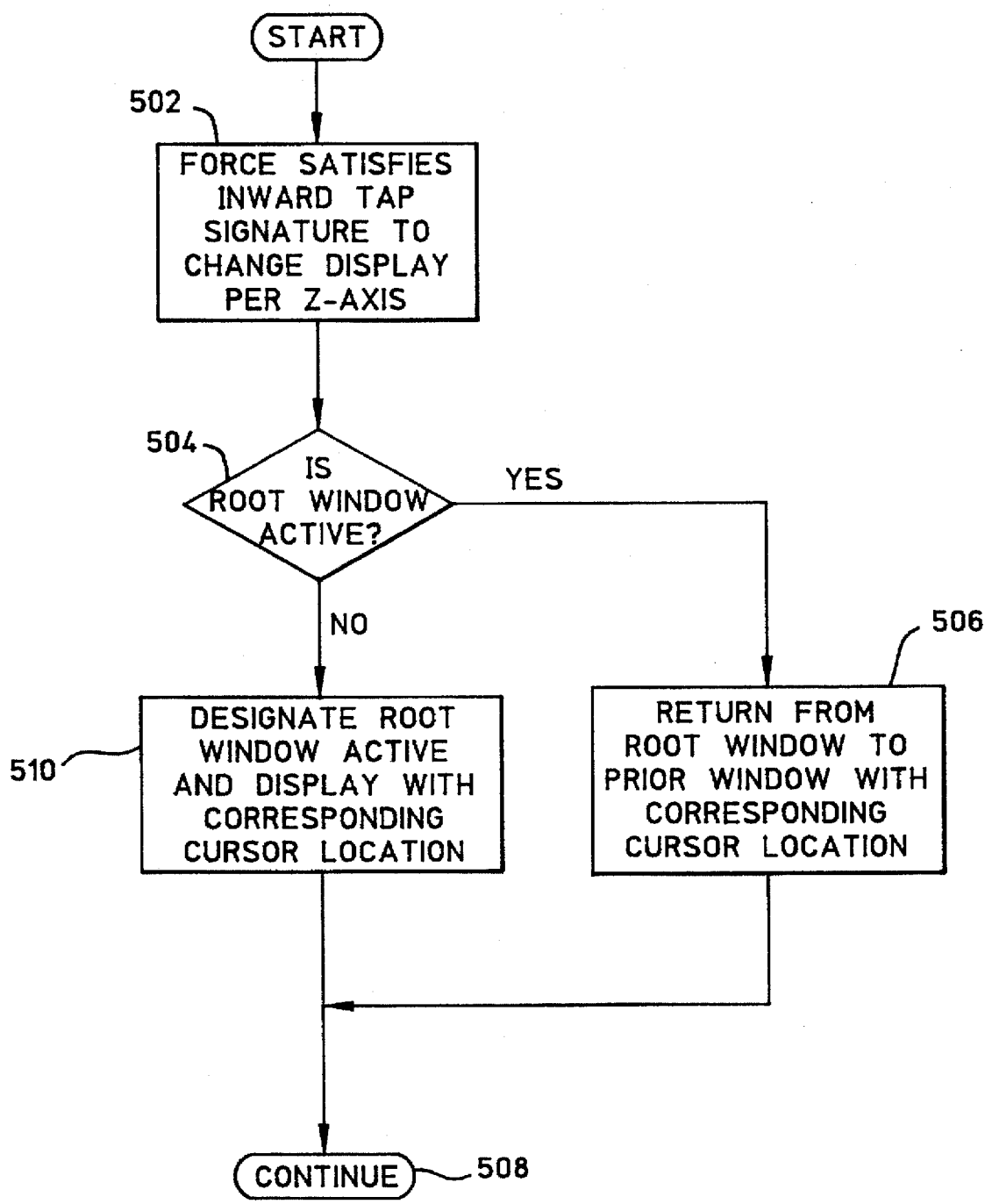

FIG. 14 illustrates the processing for a z-axis display change tap (box 220 in FIG. 11) according to the preferred embodiment, in which z-axis taps are mapped to activating a predetermined root window. First, the tap signature to change the window display is detected at the box numbered 502. The z-axis input is detected as a push to the control actuator, indicating a change in state. At the decision box numbered 504, the display controller checks to determine if the root window is active. If it is active, then at the flow diagram box numbered 506 the display controller returns from the root window to the prior active window, along with the corresponding cursor position. Processing continues at box 508. If the root window was not active when a z-axis tap signature was detected, then at the flow diagram box numbered 510, the display controller displays the predetermined window, such as a root window, along with the corresponding cursor location. Thus, if a cursor context queue is used to select an active window for the display, then the root window identifier is placed in the top cursor context queue position or otherwise indicated as the active window. Processing resumes at the flow diagram box numbered 508. It should be noted, once again, that many different parameters can be selected for the respective control axis processing and cursor context queue ordering.

The pointing system described above provides a computer system in which a control actuator ordinarily controls movement of a cursor on a computer system display device in response to continuous force applications and changes the display in response to applications of force satisfying a tap signature criterion having, for example, a predetermined time interval and range of force values. This permits enhanced control of the display screen so that a single control actuator can control cursor movement and also initiate display screen changes or provide program access. As programs are accessed and re-entered, the pointing system described above preserves the cursor location within each window from the last activated location. This enhanced program access permits convenient and rapid access from program to program of the graphical user interface.

For each axis of control actuator movement that can be detected, a different system function can be assigned. The functions can comprise predetermined display changes, such as described above in connection with FIGS. 6-10, or can duplicate functions provided by programmable function keys of conventional computer keyboards, or can be user-defined functions. Regardless of the system function, the control actuator provides cursor movement control and enhanced system access.

The present invention has been described above in terms of a presently preferred embodiment so that an understanding of the present invention can be conveyed. There are, however, many configurations for display cursor control systems not specifically described herein but with which the present invention is applicable. The present invention should therefore not be seen as limited to the particular embodiment described herein, but rather, it should be understood that the present invention has wide applicability with respect to display cursor control systems generally. All modifications, variations, or equivalent arrangements that are within the scope of the attached claims should therefore be considered to be within the scope of the invention.

We claim:

1. A pointing system for controlling a graphical user interface displayed on a computer system display device having a keyboard including a plurality of keys, said keys being responsive to force thereon by moving in a first direction, a keyboard control actuator for moving a display cursor of the graphical user interface, and a force transducer that detects forces applied to the control actuator in one of more lateral directions substantially perpendicular to the first direction, the pointing system comprising:

a tap signature identifier that detects forces applied to the keyboard control actuator in the lateral directions and determines whether said lateral forces are applied for a first predetermined time interval and then released such that the applied forces correspond to one of multiple predetermined tap signatures each defined by a function of magnitude and direction of applied force occurring over the first predetermined time interval and thereby comprising a display change tap; and a display controller that (1) responds to lateral forces applied to the control actuator and indicated by the tap signature identifier as comprising display change taps, by initiating display actions corresponding to said display taps and that (2) otherwise responds to lateral control actuator forces not representing the predetermined display change taps by moving the cursor across the display in accordance with the force applied to the keyboard control actuator.

2. A pointing system as defined in claim 1, wherein the display controller causes the first display action to be initiated only if no control actuator force is detected for a second predetermined time interval that precedes the first predetermined time interval, which has been determined by the tap signature identifier to comprise a display change tap interval.

3. A pointing system as defined in claim 1, wherein the display device displays a plurality of overlapped computer system operating windows and a first one of said display actions performed by the display controller comprises bringing a different one of the windows to the top of the display.

4. A pointing system as defined in claim 3, wherein the pointing system includes a cursor context queue that contains a top-to-bottom ordered list of the displayed operating windows and corresponding cursor locations for each of the windows such that the operating window at the top of the queue and the corresponding cursor location are displayed.

5. A pointing system as defined in claim 1, wherein the control actuator comprises a stick control device.

6. A pointing system as defined in claim 5, wherein:
the force transducer determines the control actuator force as a combination of forces applied along either an x-axis or a y-axis of the control actuator; and
the display controller causes a first one of said display actions to be initiated only if the control actuator force is applied substantially along either the x axis or the y axis.

7. A pointing system as defined in claim 6, wherein the display device displays a plurality of overlapped computer system operating windows and the first display action performed by the display controller comprises bringing a different one of the windows to the top of the display.

8. A pointing system as defined in claim 7, wherein the display controller causes the first display action to be initiated only if the control actuator force is applied substantially along the x axis and causes a second display action to be initiated only if the control actuator force is applied substantially along the y axis.

9. A pointing system as defined in claim 8, wherein:
the system further includes a cursor context queue that contains a list of the displayed operating windows and corresponding cursor locations for each of the windows and the first display action comprises displaying the operating window at the top of the queue and the corresponding cursor location in the window.

10. A pointing system as defined in claim 9, wherein:
the cursor context queue includes automatic queue entries and user-defined entries such that current window displays and corresponding cursor locations are automatically loaded into the cursor context queue in response to user window display commands and current window displays and corresponding cursor locations are loaded into the cursor context queue in response to predetermined user queue control commands.

11. A pointing system as defined in claim 10, wherein the display controller cycles the top-most cursor context from among the automatic queue entries of the cursor context queue in response to display change taps along the x axis and displays the top-most cursor context as the active window, and cycles the top-most cursor context from among the user-defined queue entries of the cursor context queue in response to display change taps along the y axis and displays the top-most cursor context as the active window.

12. A pointing system as defined in claim 5, wherein:
the force transducer can determine the control actuator force as a combination of forces applied in an x-y plane and along a z-axis; and
the display controller causes a first one of said display actions to be initiated if the force is applied substantially only in the x-y plane and causes a second display action to be initiated if the force is applied substantially only along the z-axis.

13. A pointing system as defined in claim 12, wherein the display device displays a plurality of overlapped computer system operating windows and the first display action comprises bringing a different one of the windows to the top of the display.

14. A pointing system as defined in claim 5, wherein:
the force transducer can determine the control actuator force as a combination of forces applied along an x-axis, a y-axis, and a z-axis; and
the display controller causes a first one of said display actions to be initiated if the force is applied substantially only along the x axis, causes a second display action to be initiated if the force is applied substantially only along the y axis, and causes a third display action to be initiated if the force is applied substantially only along the z axis.

15. A pointing system as defined in claim 14, wherein the display device displays a plurality of overlapped computer system operating windows and the first display action performed by the display controller comprises bringing a different one of the windows to the top of the display.

16. A pointing system as defined in claim 14, wherein:
the display device displays a plurality of overlapped computer system operating windows; and
the system further includes a cursor context queue that contains a top-to-bottom ordered list of the displayed operating windows in the order of overlapping and contains corresponding cursor locations for each of the windows such that the operating window at the top of the queue is the top window displayed on the display device and the other windows in the queue are overlapped in accordance with their respective order in the queue.

17. A pointing system as defined in claim 16, wherein the first display action performed by the display controller comprises cycling among the entries in the cursor context queue such that the second overlapped window is brought to the top of the queue, the second display action performed by the display controller comprises cycling among the entries in the cursor context queue such that the bottom cursor context is brought to the top of the cursor context queue, and the third display action performed by the display controller comprises bringing a predetermined one of the cursor contexts to the top of the cursor context queue.

18. A computer system comprising:
a host processor;
a keyboard comprising a plurality of keys that provide input data to the host processor, said keys being responsive to force thereon by moving in a first direction;
a display device that displays a cursor;
a keyboard cursor control actuator that can be actuated to cause movement of the display cursor;
a force transducer that detects the direction and magnitude of forces applied to the keyboard control actuator in one or more lateral directions substantially perpendicular to the first direction;
a tap signature identifier that detects forces applied to the keyboard control actuator in the lateral directions and determines whether said lateral forces are applied for a first predetermined time interval and then released such that the applied forces correspond to one of multiple predetermined tap signatures each defined by a function of applied force magnitude and direction occurring over the first predetermined time interval and thereby comprising a display change tap; and a display controller that (1) responds to lateral forces applied to the keyboard control actuator and indicated by the tap signature identifier as comprising display change taps, by initiating display actions corresponding to said display taps, and that (2) otherwise responds to lateral keyboard control actuator forces not representing the predetermined display change taps by moving the cursor across the display in accordance with the force applied to the keyboard control actuator.

19. A pointing system as defined in claim 18, wherein the pointing system includes a cursor context queue that contains a top-to-bottom ordered list of the displayed operating windows and corresponding cursor locations for each of the windows such that the operating window at the top of the queue is the top window displayed on the display device.

20. A computer system as defined in claim 19, wherein the tap signature identifier includes a timer that detects time intervals during which forces are applied to the control actuator and the tap signature identifier identifies display change taps as being those forces detected by the timer that are applied for the predetermined first time interval and then released and that are identified by the force transducer as having a magnitude less than a predetermined tap force.

21. A computer system as defined in claim 18, wherein the tap signature identifier compares the control actuator force to a function of force and time that comprises a predetermined waveform and identifies display change taps as those control actuator forces that substantially match the predetermined waveform.

22. A computer system as defined in claim 18, wherein the display controller causes the first display action to be initiated only if no control actuator force is detected for a second predetermined time interval, that precedes the a display change tap.

23. A computer system as defined in claim 18, wherein:
the control actuator comprises a stick control device oriented substantially perpendicular to the keyboard; and
the force transducer can determine the force applied to the control actuator as a combination of forces applied along an x-axis that is parallel to rows of the keyboard and along a y-axis that is perpendicular to the x-axis and in the plane of the keyboard.

24. A computer system as defined in claim 23, wherein the force can be applied to the control actuator along an x-axis, a y-axis, and a z-axis and wherein the display controller causes the first display action to be initiated if the force is applied substantially along the x-axis and causes a second display action to be initiated if the force is applied substantially along the y-axis.

25. A computer system as defined in claim 23, wherein:
the force transducer can determine the force applied to the control actuator as a combination of forces applied in an x-y plane and along a z-axis; and
the display controller causes the first display action to be initiated if the force is applied substantially in the x-y plane and causes a second display action to be initiated if the force is applied substantially along the z-axis.

26. A computer system as defined in claim 23, wherein:
the force transducer can determine the force applied to the control actuator as a combination of forces applied along an x-axis, a y-axis, and a z-axis; and the display controller causes the first display action to be initiated if the force is applied substantially along the x axis, causes a second display action to be initiated if the force is applied substantially along the y axis, and causes a third display action to be initiated if the force is applied substantially along the z axis.

27. A method of responding to forces applied to a keyboard cursor control actuator provided in a keyboard having multiplicity of keys responsive to force thereon by moving in a first direction, the control actuator controlling a cursor displayed on a computer display device of a computer system, the method comprising the steps of:

detecting the magnitude and direction of a force applied to the keyboard cursor control actuator in a lateral direction substantially perpendicular to the first direction;

detecting a time interval during which the keyboard control actuator force is applied to the keyboard control actuator and then released; and initiating a first display action in response to the lateral forces applied to the keyboard control actuator if the keyboard control actuator force is determined to correspond to any one of multiple predetermined tap signatures each defined by a function of applied force magnitude and direction occurring over the determined time interval, and otherwise if the lateral forces applied to the keyboard control actuator do not represent any of the tap signatures waveform, responding to the keyboard control actuator force by moving the cursor across the display in accordance with the lateral forces applied to the keyboard control actuator.

28. A method as defined in claim 27, wherein the predetermined tap signature waveform comprises a short duration waveform having a relatively quickly rising leading edge and a relatively slowly falling trailing edge.

29. A method as defined in claim 27, wherein the predetermined tap signature waveform comprises an applied force within a predetermined range of force values that is applied to the control actuator for a first predetermined time interval.

30. A method as defined in claim 27, wherein the step of initiating a first display action further comprises the steps of:

determining if the applied force corresponding to the tap signature waveform is preceded by a predetermined blank time interval, in which no control actuator force is detected;

initiating the first display action only if the predetermined blank time interval precedes the applied force interval and otherwise moving the cursor across the display in accordance with the force applied to the control actuator.

31. A method as defined in claim 27, wherein the display device displays a plurality of computer system operating windows overlapped on the display and the first display action comprises bringing a different one of the operating windows to the top of the display.

32. A method as defined in claim 27, wherein:
the step of detecting a control actuator force applied to the cursor control actuator comprises determining the force as a combination of forces applied to the control actuator along an x-axis and a y-axis; and the step of initiating the first display action comprises initiating the first display action if the force is applied substantially along the x-axis and initiating a second display action if the force is applied substantially along the y-axis.

33. A method as defined in claim 27, wherein:

the step of detecting a control actuator force applied to the cursor control actuator comprises determining the force as a combination of forces applied to the control actuator along an x-axis, a y-axis, and a z-axis; and the step of initiating the first display action comprises initiating the first display action if the force is applied substantially along the x-y plane and initiating a second display action if the force is applied substantially along the z-axis.

34. A method as defined in claim 27, wherein:

the step of detecting a control actuator force applied to the cursor control actuator comprises determining the force as a combination of forces applied to the control actuator along an x-axis, a y-axis, and a z-axis; and the step of initiating the first display action comprises initiating the first display action if the force is applied substantially only along the x axis, initiating a second display action if the force is applied substantially only along the y axis, and initiating a third display action if the force is applied substantially only along the z axis.

35. In a pointing system that includes a keyboard with a plurality of keys movable in a vertical direction, a pointing stick attached to the keyboard and having a tip movable in lateral directions substantially perpendicular to the first direction, a force transducer detecting said lateral forces applied to the pointing stick, and a display providing a cursor, a controller comprising:

a tap signature identifier coupled to the force transducer to determine whether lateral forces being applied to the pointing stick correspond to any one of multiple predetermined tap signatures, each tap signature defined by a predetermined magnitude, direction, and duration of applied force, each tap signature being associated with a predetermined display action performable by the display; and a display controller, coupled to the tap signature identifier and the force transducer, said display controller signalling the display to perform a particular one of the predetermined display actions in response to the tap signature identifier determining that lateral forces being applied to the pointing stick correspond to a tap signature associated with the particular display action; and said display controller otherwise, in the absence of lateral forces being applied to the pointing stick that correspond to any of the predetermined tap signatures, signalling the display to move the cursor across the display according to lateral forces applied to the pointing stick.

36. A pointing system, comprising:

a keyboard including a plurality of keys each being reciprocatingly depressable in a vertical direction for a user to select a number, letter, character, or other function specifically associated with that key;

a full-time pointing stick attached to the keyboard and having a tip movable in lateral directions substantially perpendicular to the first direction;

a force transducer coupled to the pointing stick to detect said lateral forces applied to the pointing stick;

a tap signature identifier coupled to the force transducer to determine whether lateral forces being applied to the pointing stick correspond to any one of multiple predetermined tap signatures, each tap signature defined by a predetermined magnitude, direction, and duration of lateral force applied to the pointing stick, each tap signature being associated with a predetermined display action performable upon a display; and a display controller, coupled to the tap signature identifier and the force transducer, said display controller signalling the display to perform a particular one of the predetermined display actions whenever the tap signature identifier identifies a tap signature specifically associated with the particular display action, in the absence of any tap signatures being identified, the display controller directing motion of the cursor within the display according to the applied lateral forces.

* * * * *